Dec. 13, 1927.
E. C. MOGFORD ET AL
1,652,630
METHOD OF MAKING REAR AXLE HOUSINGS FOR MOTOR VEHICLES
Filed Aug. 2, 1926
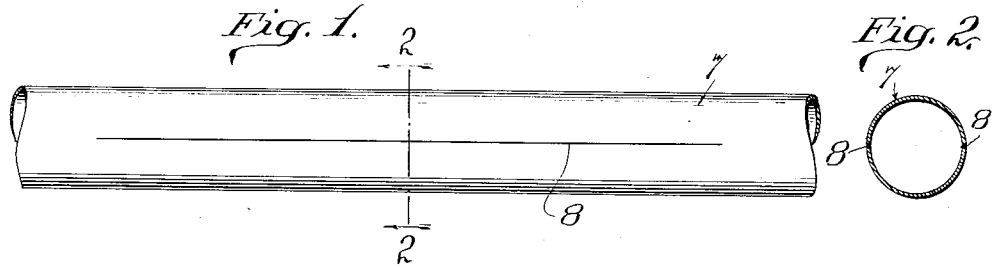
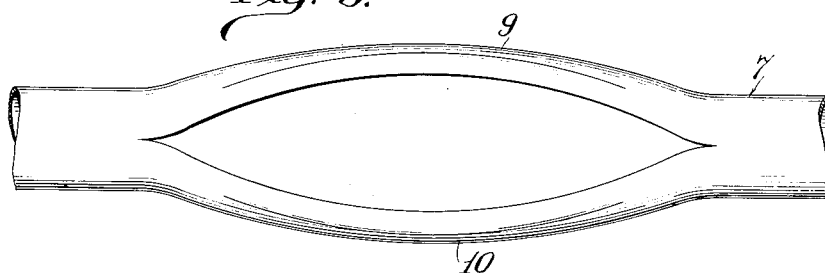
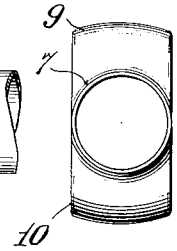
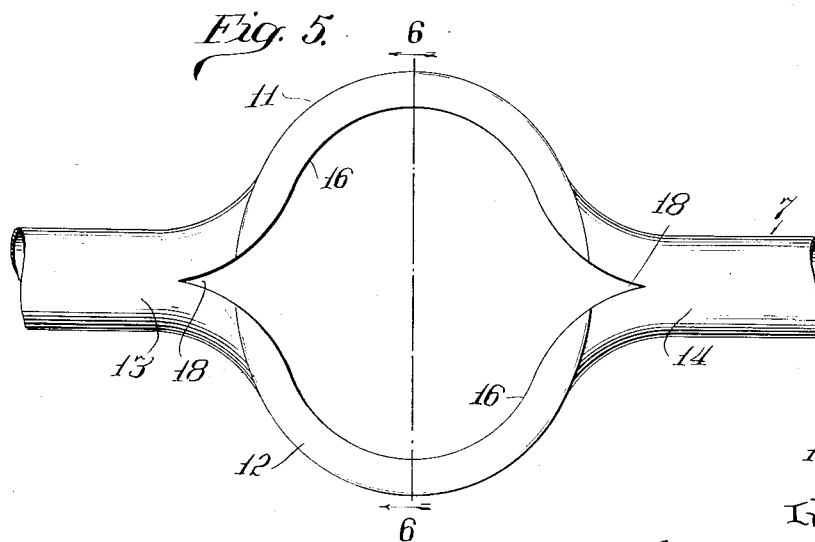
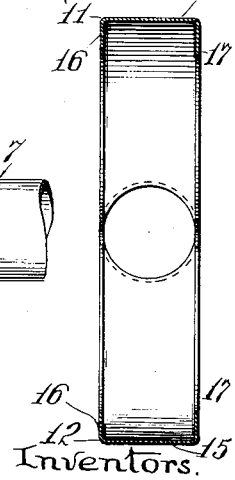

Patented Dec. 13, 1927.

1,652,630

UNITED STATES PATENT OFFICE.

EDMUND C. MOGFORD, OF BUCHANAN, AND FREDERICK W. BURGER, OF NILES, MICHIGAN, ASSIGNORS TO CLARK EQUIPMENT COMPANY, OF BUCHANAN, MICHIGAN, A CORPORATION OF MICHIGAN.

METHOD OF MAKING REAR-AXLE HOUSINGS FOR MOTOR VEHICLES.

Application filed August 2, 1926. Serial No. 126,451.

Our invention relates to motor vehicles of the type provided with a differential gearing and live axle members for driving the rear wheels, all enclosed in a housing that comprises a central cylindrical portion having openings at the front and rear, to give access to the differential gearing which is enclosed in such cylindrical portion, and end portions in the form of elongated sleeves through which the live axle members extend. In some cases such sleeves carry spring seats for the springs on which the rear portion of the vehicle is supported. The central openings of the housing are usually closed by removable plates, the front plate having provision for the reception and support of a propeller shaft by which the differential gearing is driven from the motor. An example of this type of axle is shown and described in the pending application of Edmund C. Mogford, one of the present applicants, filed May 7, 1925, Serial No. 28,599.

In the manufacture of axle housings of the type referred to the practice generally followed is to make them of flat steel pressed and formed into shape, which in every instance leaves an open edge which must be welded either autogenously or electrically, which is objectionable. Furthermore, the present practice is also objectionable because it is not economical in the use of materials, and is expensive not only because of the cost of labor, but also because it is necessary to use large, heavy, high priced machinery. This will be apparent when it is considered that following the present practice the operation of forming a housing starts out with a flat rectangular piece of steel of the desired thickness, which is blanked to shape, thereby causing a certain amount of the sheet to be cut away, which becomes scrap. The blanking die of necessity assumes quite large dimensions, which in turn calls for a large powerful press, and the blanks after having been cut to shape must be placed in a drawing die, which must also be very large. After the blank is drawn it must be trimmed, and the two halves of the housing, which requires two stampings, must then be welded together, which consumes considerable time as well as fuel. The welding operation is very expensive and slow. In some instances the housing is made of one piece folded, so that only one welded seam is produced, but in either case the manufacturing operations are costly.

The object of our present invention is to avoid the objections to the practice heretofore in use and to produce a better housing which is weldless and seamless, by fashioning the housing to the desired shape out of a piece of seamless tubing, which object we accomplish as illustrated in the accompanying drawings and as hereinafter described. What we regard as new is set forth in the claims.

In the accompanying drawings, which illustrate diagrammatically the several steps practiced in producing our improved housing,—

Fig. 1 is a view showing a seamless tube such as is used in the production of the housing, after the first operation has been performed on it;

Fig. 2 is a section on line 2—2 of Fig. 1;

Fig. 3 is a view similar to Fig. 1, showing the tube after the second operation;

Fig. 4 is an end view of the tube in the condition shown in Fig. 3;

Fig. 5 is a view of the tube shown in Figs. 1 and 3 after the completion of the next or final step in shaping the tube; and Fig. 6 is a section on line 6—6 of Fig. 5.

In practicing our improved process we take a piece of seamless steel tubing 7 of the desired length, and shear it midway of its length for a predetermined distance parallel with the tube axis, as shown by the line 8 in Fig. 1, which line represents the cut. As shown in Fig. 2, corresponding cuts are made in the tube at diametrically opposite points, these two cuts being parallel with each other and of the same length. The interior of the tube is then forced apart along the line of the cuts, as shown in Fig. 3, forming bulged or concavo-convex central portions 9, 10. The tube is then put into a die, so that the strains and pressures can be directed where necessary, and inward pressure along its axis is applied to the ends of the tube to reduce it longitudinally and expand it centrally, with the result that the bulged portions 9, 10 are then caused to assume the rounded form shown at 11, 12 in Fig. 5, thereby giving the central portion of the tube a circular or slightly elliptical contour that merges into end portions 13, 14 which constitute sleeves to receive and enclose the live axle members. Through the medium of expanding dies the center portion is formed to the desired shape and size. In the latter operation the outer surfaces of the rounded portions 11, 12 are flattened, as shown at 15 in Fig. 6, and they are also flattened at the sides to form inwardly extending flanges 16, 17 substantially at right angles to the flat surfaces 15 shown in Fig. 6. The flanges 16, 17 serve as means for the attachment to the central portion of the housing of the usual cover plates hereinbefore referred to, which may be shaped to cover the V-shaped spaces 18 shown in Fig. 5. Said spaces may, however, be closed in any other suitable way.

By the method described we are able to produce a seamless axle housing that is greatly superior to the housings heretofore manufactured, and which may be manufactured at less expense.

What we claim as our invention and desire to secure by Letters Patent, is—

1. The method of making an axle housing from a piece of seamless steel tubing which consists in shearing the tubing for a suitable distance parellel with its axis, and at diametrically opposite points midway of its length, then forcing apart the material at opposite sides of the cuts, and then applying inward pressure to the end portions of the tube along the line of its axis to further expand the central portion thereof.

2. The method of making an axle housing from a piece of seamless steel tubing which consists in shearing the tubing for a suitable distance parallel with its axis, and at diametrically opposite points midway of its length, forcing apart the material at opposite sides of the cuts, placing the tube in a suitable die, and then applying inward pressure to the ends of the tube along the line of its axis to further expand the central portion thereof.

3. The method of making an axle housing from a piece of seamless steel tubing which consists in shearing the tubing for a suitable distance parallel with its axis, and at diametrically opposite points midway of its length, forcing apart the material at opposite sides of the cuts, then applying inward pressure to the end portions of the tube along the line of its axis to further expand the central portion thereof, and completing the shaping of the central portion of the housing by the use of expanding dies.

4. The method of making an axle housing from a piece of seamless steel tubing which consists in shearing the tubing for a suitable distance parallel with its axis, and at diametrically opposite points midway of its length, forcing apart the material at opposite sides of the cuts, placing the tube in a suitable die, then applying inward pressure to the end portions of the tube along the line of its axis to further expand the central portion thereof, and completing the shaping of the central portion of the housing by the use of expanding dies.

EDMUND C. MOGFORD.
FREDERICK W. BURGER.